United States Patent
Jindani et al.

(10) Patent No.: US 7,464,400 B2
(45) Date of Patent: Dec. 9, 2008

(54) DISTRIBUTED ENVIRONMENT CONTROLLED ACCESS FACILITY

(75) Inventors: Rahul Jindani, South Burlington, VT (US); Vinod Kannoth, Glen Allen, VA (US); Deepak Kanwar, South Burlington, VT (US); Rinku Kanwar, Saint Paul, MN (US); Jay Krishnamurthy, Framingham, MA (US); Gregory L. McKee, Concord, NC (US); Sandeep Mehta, Colchester, VT (US); Penny J. Peachey-Kountz, South Burlington, VT (US); Ravi K. Ravipati, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 10/249,623

(22) Filed: Apr. 24, 2003

(65) Prior Publication Data
US 2003/0204751 A1    Oct. 30, 2003

Related U.S. Application Data

(60) Provisional application No. 60/375,239, filed on Apr. 24, 2002.

(51) Int. Cl.
*G06F 7/04* (2006.01)
*H04L 9/32* (2006.01)
*H04L 9/00* (2006.01)
*H04N 7/167* (2006.01)

(52) U.S. Cl. .......... 726/4; 726/2; 726/3; 726/5; 726/6; 726/27; 726/28; 726/29; 726/30; 713/170; 713/171; 713/172; 713/173; 380/231; 380/232; 380/233; 380/234

(58) Field of Classification Search .......... 726/4
See application file for complete search history.

(56) References Cited

U.S. PATENT DOCUMENTS

| | | | |
|---|---|---|---|
| 5,251,209 A | 10/1993 | Jurkevich et al. | 370/82 |
| 5,349,674 A | 9/1994 | Calvert et al. | 395/800 |
| 5,627,967 A * | 5/1997 | Dauerer et al. | 726/2 |
| 5,649,099 A | 7/1997 | Theimer et al. | 395/187.01 |
| 5,864,871 A | 1/1999 | Kitain et al. | 707/104 |
| 5,890,140 A | 3/1999 | Clark et al. | 705/35 |
| 5,892,905 A | 4/1999 | Brandt et al. | 395/187.01 |
| 6,115,821 A | 9/2000 | Newby et al. | 713/200 |
| 6,223,292 B1 | 4/2001 | Dean et al. | 713/202 |
| 6,252,964 B1 | 6/2001 | Wasilewski et al. | 380/282 |
| 6,289,381 B1 | 9/2001 | Brodigan | 709/225 |
| 6,721,713 B1 * | 4/2004 | Guheen et al. | 705/1 |
| 2002/0066033 A1 * | 5/2002 | Dobbins et al. | 713/201 |
| 2002/0077985 A1 * | 6/2002 | Kobata et al. | 705/51 |
| 2002/0116620 A1 * | 8/2002 | Gimbert et al. | 713/185 |

* cited by examiner

*Primary Examiner*—Longbit Chai
(74) *Attorney, Agent, or Firm*—Ryan K. Simmons; Greenblum & Bernstein P.L.C.

(57) ABSTRACT

A computer implemented web based access control facility for a distributed environment, which allows users to request for access, take the request through appropriate approval work flow and finally make it available to the users and applications. This program also performs an automatic task of verifying the health of data, access control data as well as the entitlements, to avoid malicious user access. The system also provides an active interface to setup a backup, to delegate the duty in absence. Thus this system provides a comprehensive facility to grant, re-certify and control the entitlements and users in a distributed environment.

12 Claims, 5 Drawing Sheets

DISTRIBUTED ENVIRONMENT CONTROLLED ACCESS FACILITY

CROSS REFERENCE TO RELATED APPLICATIONS

This application claims benefit of U.S. Provisional Application No. 60/375,239, filed Apr. 24, 2002.

BACKGROUND OF INVENTION

1. Field of the Invention

The present invention generally relates to computer implemented control facility and support tools, and more particularly, a web based access control facility in a distributed environment.

2. Background Description

In a complex system like a manufacturing environment spread across the globe, it is very difficult to manage and control the access to various subsystems. Current systems have their own access control with no unified approach to the users from other systems and applications. Most of the systems cannot provide cross system inter operability due to the manual process of providing access.

This manual process further cripples the task of tracing and keeping track of users who no longer use the system or who left a position and no longer need the use the system. This is potentially a dangerous security breach if the user is left with access. This problem becomes acute and chronic if the systems are distributed and spread across geographies.

Further in a manual process, delegation of duty, in absence of the representative, can be chaotic and improper. In a manual system delegation can be done by communications such as e-mail or phone call. However, there is an isolated chance of it getting lost, and becoming a block in the system. This can also become a security problem since e-mail or phone calls, as other modes of communication, can be diverted, mischaracterized or tapped.

In traditional prior art access control facilities, the entire authentication is done at one time and for a limited set or domain of users. One of the limitations or handicaps of the prior systems is data centralization and data ownership. One owner or no owner is identified for the data, which severely limits the authentication of data and users. Since only the owner of the data can authenticate users, data ownership is a critical part of a distributed system.

There are automated systems in the prior art that deal with entitlements and access, especially in our webworld. However, they tend to be centralized and targeted to specific applications. An example is U.S. Pat. No. 6,223,292 issued to Dean et al. In this invention users are provided with graduated services provided by a media server. When the media server receives a streaming service request from a user the media server evaluates the user according to service level by analyzing the password. A second invention is U.S. Pat. No. 6,115,821 issued to Newby et al. which provides an access control processor for display of a message related to an authorization status of an information receiver, when the information is provided by a plurality of service providers. Another invention of this type is U.S. Pat. No. 5,890,140 issued to Clark et al. which integrates interactive financial services to allow access to multiple financial products from a single location.

A webentitlement system which is ideally suited for investment research reports and investment advisors and for corporate financial information is U.S. Pat. No. 5,864,871 to Kitain et al. It bases its entitlements on a user identification code and password.

SUMMARY OF INVENTION

As a result of the distributed nature of access control, data changes and verifications, as well as user migrations from one system to another system becomes a challenging task. This makes it necessary for creation of different roles. It also poses a new problem of transfer of ownership of data and users, which happen seamlessly without affecting the user.

Accordingly a facility of separation of duties, automatic revalidation of users, content visibility based on the type of user, fully automated request, review and authentication process, as well as a system controlled delegation of duty in case of absence is needed. Further, its important to have a capability to work across systems and to provide a seamless access to different facilities from one point.

It is therefore a purpose of the present invention to provide an integrated access control facility for a distributed environment.

Another purpose of the present invention to provide a system that can allow a user to setup data without altering the system structure.

It is yet another purpose of the present invention to allow users to request the necessary access (hereinafter known as entitlements), from a common interface.

It is yet another purpose of the present invention to check automatic separation of duties with a capability of manual override if necessary.

It is another purpose of the present invention to provide automated access approval work flow, with a system action after a configurable time.

It is yet another purpose of the present invention to provide a facility for delegation of duty in the absence of the entitled user.

It is yet another purpose of the present invention to provide a facility to setup and change the data ownership as well as users.

It is yet another purpose of the present invention to revalidate data and users automatically on expiration with a manual override to start the process at any time.

And finally, another purpose of the present invention is to control the data visibility available for request.

BRIEF DESCRIPTION OF DRAWINGS

The foregoing and other objects, aspects and advantages will be better understood from the following detailed description of a preferred embodiment of the invention with reference to the drawings, in which.

DETAILED DESCRIPTION

The preferred embodiment of a distributed environment controlled access facility (DECAF) system requires the listed actors for the smooth setup and function of the system. An Administrator actor which is responsible for application setup and database administration. Approver actors which approve User actor requests for entitlements and projects.

Backup Approvers that approve in the absence of the primary Approver actors. A Business Operations Owner actor who initializes the customer enablement process. A Business Analyst actor which is responsible for entitlement definitions. A Customer Enabler actor which enables the customer. A Customer Owner actor who approves the enablement request for the customer. Deploy Lead actors that own an application's entitlements and any actions on said entitlements. Manager actors which act as approvers for internal, User actors. A Master Point of Contact (MPOC) who is the preferred embodiment DECAF system contact for external User actors and Point of Contact actors. Point of Contact actors which are responsible for external User actors and projects for a customer. A Project Enabler actor who is responsible for the creation and maintenance of projects. A Report User actor which reports visibility entitlement. A Revoke Administrator actor which is responsible for revoking User actors and entitlements. User actors which encompass any users of the preferred embodiment DECAF system not acting in the capacity of a previously defined actor.

Figure 1:
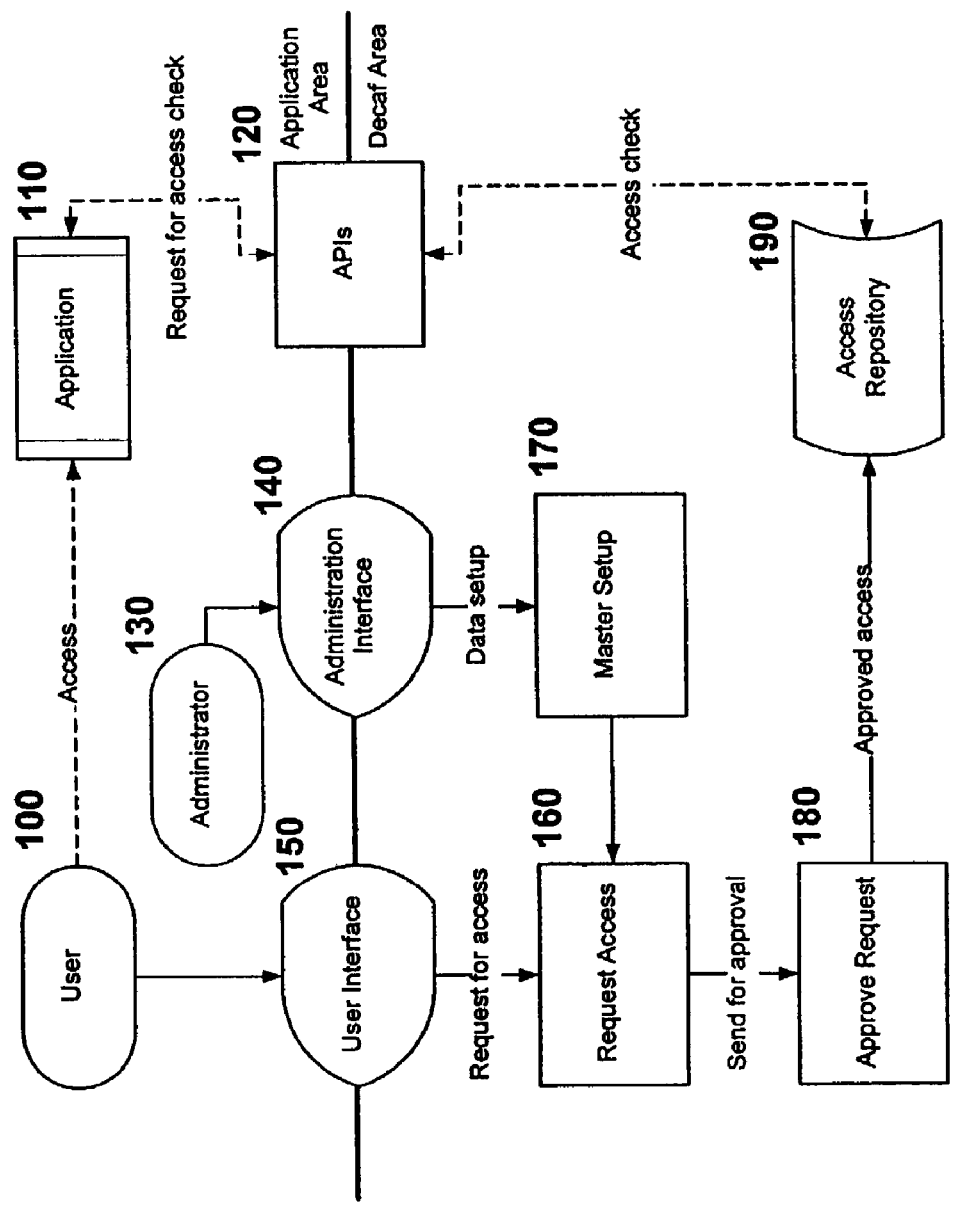
FIG. 1 is a general outline in graphical form of the preferred embodiment DECAF system.

Referring now to the drawings, and more particularly to FIG. 1, which is the behavioral example of the preferred embodiment DECAF system. This example includes an User actor in block 100, a target application in block 110, and Application Program Interface (API) calls to the preferred embodiment DECAF system in block 120.

The User actor does not have a defined point of entry. That is, entry may be initiated from within the organization's computer networks where the present invention is located (hereinafter referred to as intranet) or entry may be initiated from outside the organization's computer networks where the present invention is located (hereinafter referred to as an Internet).

The target application, depicted as a single application for ease of demonstration, may be any number of applications residing on any number of computers within an organization's intranet structure. The target application may also be any number of applications residing on any number of computers within the Internet.

In the preferred embodiment of the present invention, the normal operating work flow is defined as such: The user actor in block 100 attempts to access the target application in block 110. The target application in block 110 sends a request to the user actor for specific information. Once the user actor returns the requested information to the target application, the target application sends a series of authentication and authorization requests on behalf of the user actor in block 100 to the present invention using a the set of API calls in block 120. The Access Repository in block 190 compares the information received from the target application via the APIs in block 120 to information that was created and persisted when the target application and user actor were defined to the preferred embodiment DECAF system. The Access Repository of the preferred embodiment DECAF system in block 190 returns responses to the API calls from the target application in block 110 detailing if the user actor in block 100 is authorized to use the target application and if applicable, the level of access the user actor has in the target application. The target application receives the information and reacts the user actor accordingly.

Figure 2:
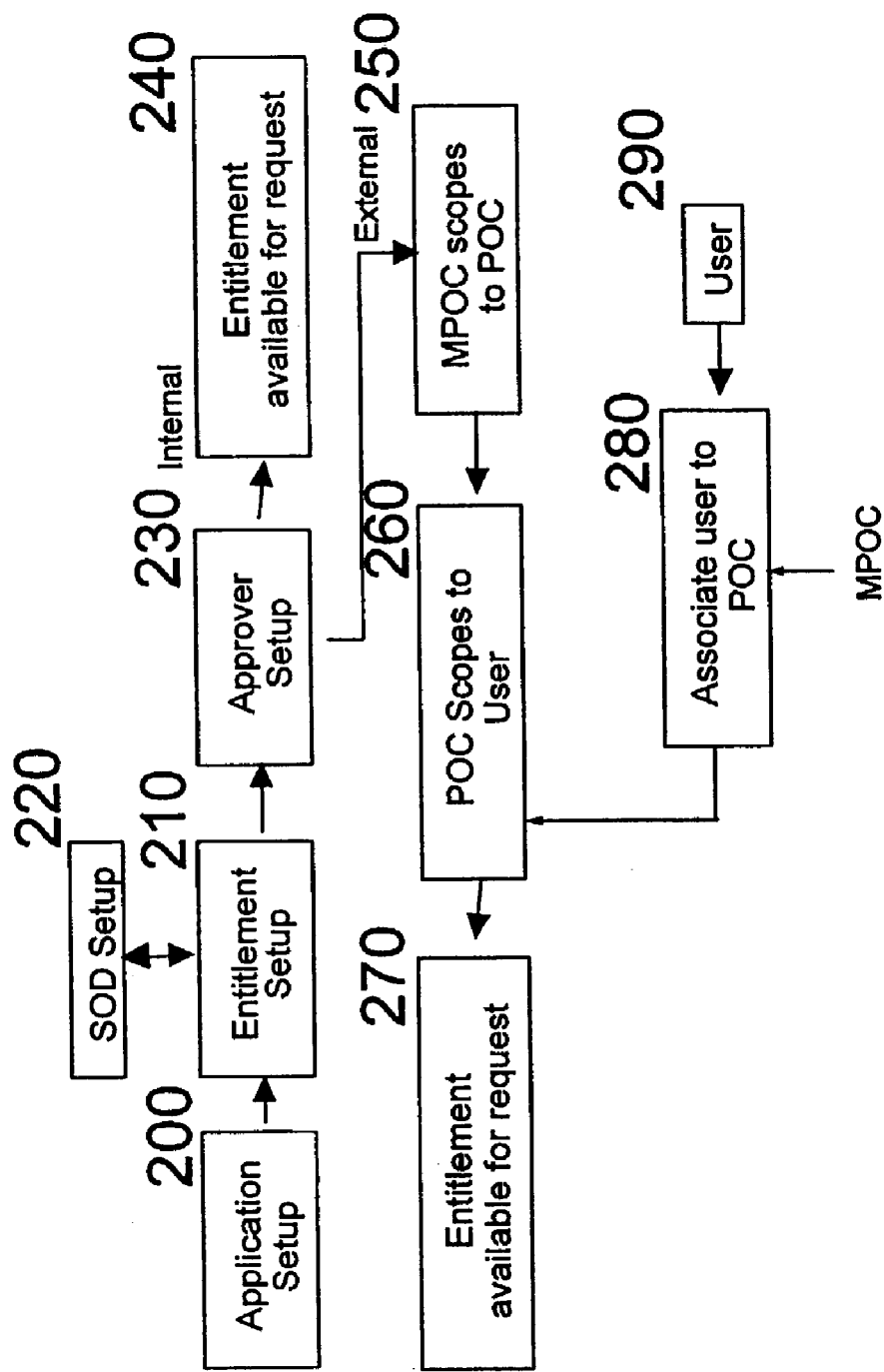
FIG. 2 is an outline in graphical form of the preferred data setup flow followed to make the preferred embodiment DECAF system operational.

As previously stated, target applications must be defined in the preferred embodiment DECAF system. This is abstractly represented in FIG. 1 by blocks 130, 140, and 170. Referring now to FIG. 2, applications are defined by the DECAF administrator actor and owned by the Deploy Lead actor. Target application setup is accomplished by the administrator actor of the DECAF system entering the required and optional information into the Application Setup screen in block 200. The required information includes, but is not limited to: 1) Application name which is a unique identifier for the application being defined. The Application will be referred to by this identifier throughout the preferred embodiment DECAF system. 2) Application description which is a general description of the application being defined to the preferred embodiment DECAF system. 3) A multiple userid selection which determines if a user actor can have multiple userids. 4) A multiple entitlement selection which determines if a multiple entitlements are permitted. The optional information includes, but is not limited to: 1) Application levels, if applicable, which is the number of base levels to be used when defining the application accessibility scope. 2) LDAP group, if applicable, defines the LDAP group used for authentication.

Upon defining an application to the preferred embodiment DECAF system, entitlements are defined for the application in block 210. An entitlement is the primary data element in the preferred embodiment DECAF system and forms the basis of all other data elements such as projects, profiles, and approvers. A Business Analyst actor enters the required and optional information using the preferred embodiment DECAF system Entitlement setup screens. The required information includes but is not limited to: 1) The entitlement name which is unique within the application. 2) The entitlement description which is a description of the entitlement. 3) The level of approvers which defines the maximum number of approvers required to approve a request for the entitlement. 4) The active dates define the start and expiration dates for the entitlement. The optional information includes but is not limited to: 1) Separation Of Duties (SOD) check determines if the SOD table is referenced during the entitlement request approval process for the specified entitlement. 2) Entitlement type which describes whether the application entitlement is available to external user actors, internal user actors, both external and internal user actors, or reserved for DECAF administration actors.

Entitlements are not available for User requests until Approver users are defined. Also, entitlements will not be visible for User request if the request dates are beyond the expiration dates of the defined entitlements.

Entitlements may be grouped into projects which allow an User actor to request and receive multiple entitlements within a single request and approval process. A Project Enabler actor is allowed to define projects using the setup screens provided by the preferred embodiment DECAF system. Information required to define a project includes but is not limited to; project name, project description, project expiration dates, and number of project approvers. Once this information is entered, the entitlements to be added to the project are selected. As before with entitlements, projects are not available for User requests until Approver actors are defined.

Figure 3:
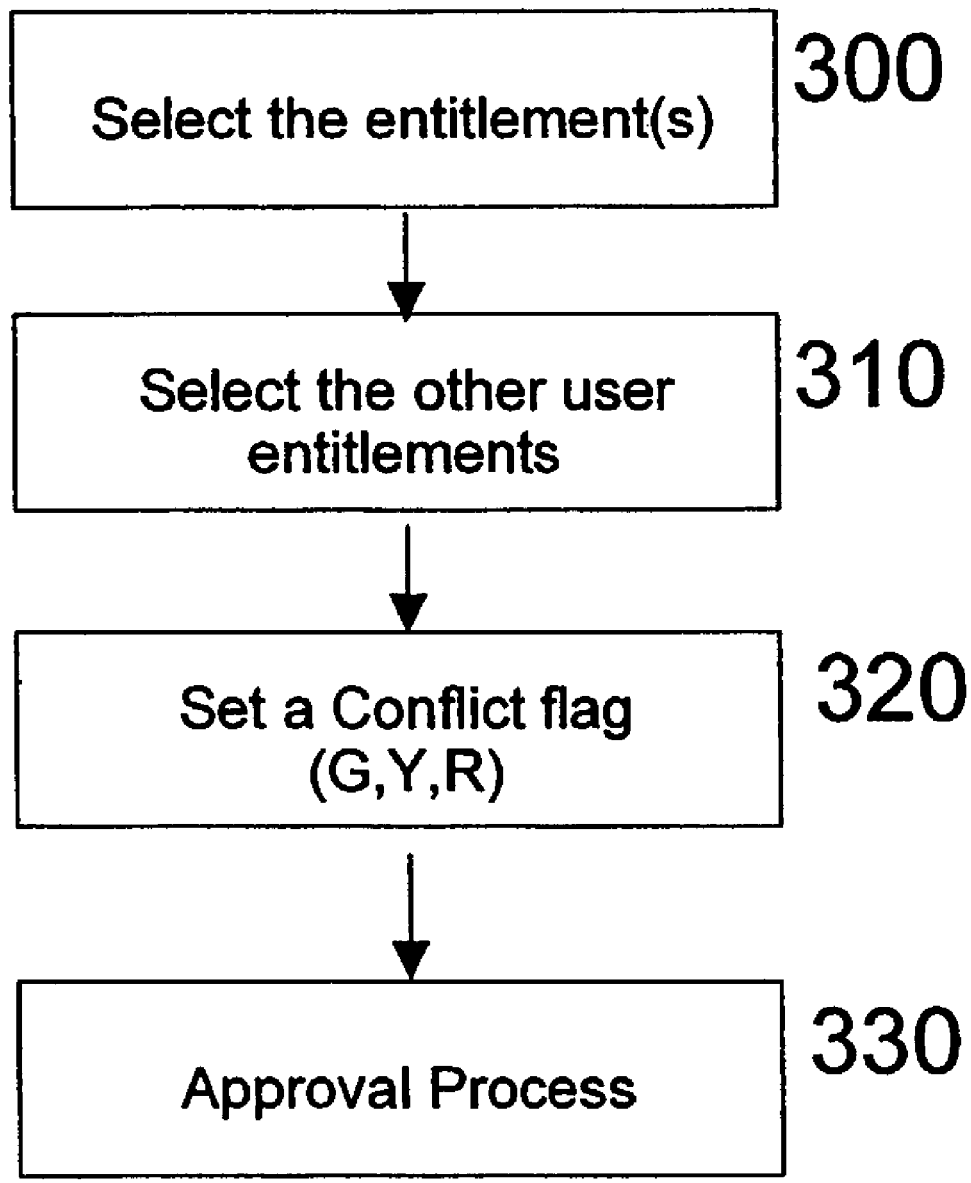
FIG. 3 defines in graphical form the preferred process of defining the Separation Of Duties matrix used in the approval process identified in FIG. 4.

The Separation Of Duties matrix of the preferred embodiment DECAF system in block 220 is defined after the application and entitlements have been defined and before the entitlements are made available for access requests. Referring now to FIG. 3, a Business Analyst actor will use the SOD setup screens of the preferred embodiment DECAF system to define the SOD matrix which may include all defined applications and entitlements. The targeted applications and entitlements are selected from the list of available entitlements in block 300. A grid is created and displayed by the preferred embodiment DECAF system containing the selected entitlements as columns and all entitlements as rows in block 310. The Business Analyst actor then selects the intersection where a conflict might exist in block 320. The conflict options are: no conflict where a request is passed to defined approvers, definite conflict where a request is rejected without going to defined Approver actors, or possible conflict where the request is flagged for review and passed to defined Approver actors. Upon completion of the grid, the Deploy Lead actors must approve the SOD matrix before it may be used in the entitlement request approval process.

Referring now back to FIG. 2, Approver actors and Backup Approver actors are defined by Deploy Lead actors and Project Enabler actors in block 230 using screens provided by the preferred embodiment DECAF system. Without this step, entitlement and project requests can not be approved for an application. Deploy Lead actors and Project Enabler actors have visibility only to entitlements and projects, respectively, which they own. The process for defining Approver actors and Backup Approver actors is the same for both Deploy Lead actors and entitlements and Project Enabler actors and projects. Therefore, Deploy Lead Actors and entitlements will be used for describing the process. 1) The application is selected from a list of available applications. 2) The entitlement is selected from a list of available entitlements. 3) A number of rows equal to the number of approvers specified when the entitlement was defined is presented for the Deploy Lead actor to define approvers with. 4) The approver sequence number is selected for each row. 5) The Approver actor name for each row is selected from a list of valid internal User actors. One row must be defined as Manager/POC. 6) The type of User actor the Approver actor will approve is selected from the choices internal, external, or both. 7) Approver actors to perform the reprocess are selected from the list of defined Approvers. The reprocess is detailed in a later section. Once Approver actors are defined for an entitlement or project the entitlement or project is available for internal User actor requests in block 240. Blocks 250 and 260 contain the processes for making an entitlement or project available to external User actors. Referring now to block 250, the Main Point of Contact (MPOC) actor assigns or scopes an entitlement, project, or mix of either to a Point of Contact (POC) actor, which was previously created by the MPOC in the preferred embodiment DECAF system. The POC actor in block 260 in turn scopes or assigns an entitlement, project, or mix of either to User actors under the POC actor's responsibility. An entitlement or project is now available for external User actor requests in block 270.

Block 290 encompasses the User actor registration and validation process. A User actor must be validated in the preferred embodiment DECAF system before entitlements can be requested for the User actor. The registration and validation process begins with the prospective User actor completing an online registration form. The prospective User actor's information is validated against the organization's internal employee list to determine if the user will be validated as an internal or external User actor. Confirmation of User actor status is immediate in the preferred embodiment DECAF system. Internal User actors are associated with an internal preferred embodiment DECAF system manager for approval of entitlement requests. External User actors are assigned to the MPOC actor who associates the external User actor to a relevant POC actor in block 280 for approval of entitlement request within the preferred embodiment DECAF system.

Figure 4:
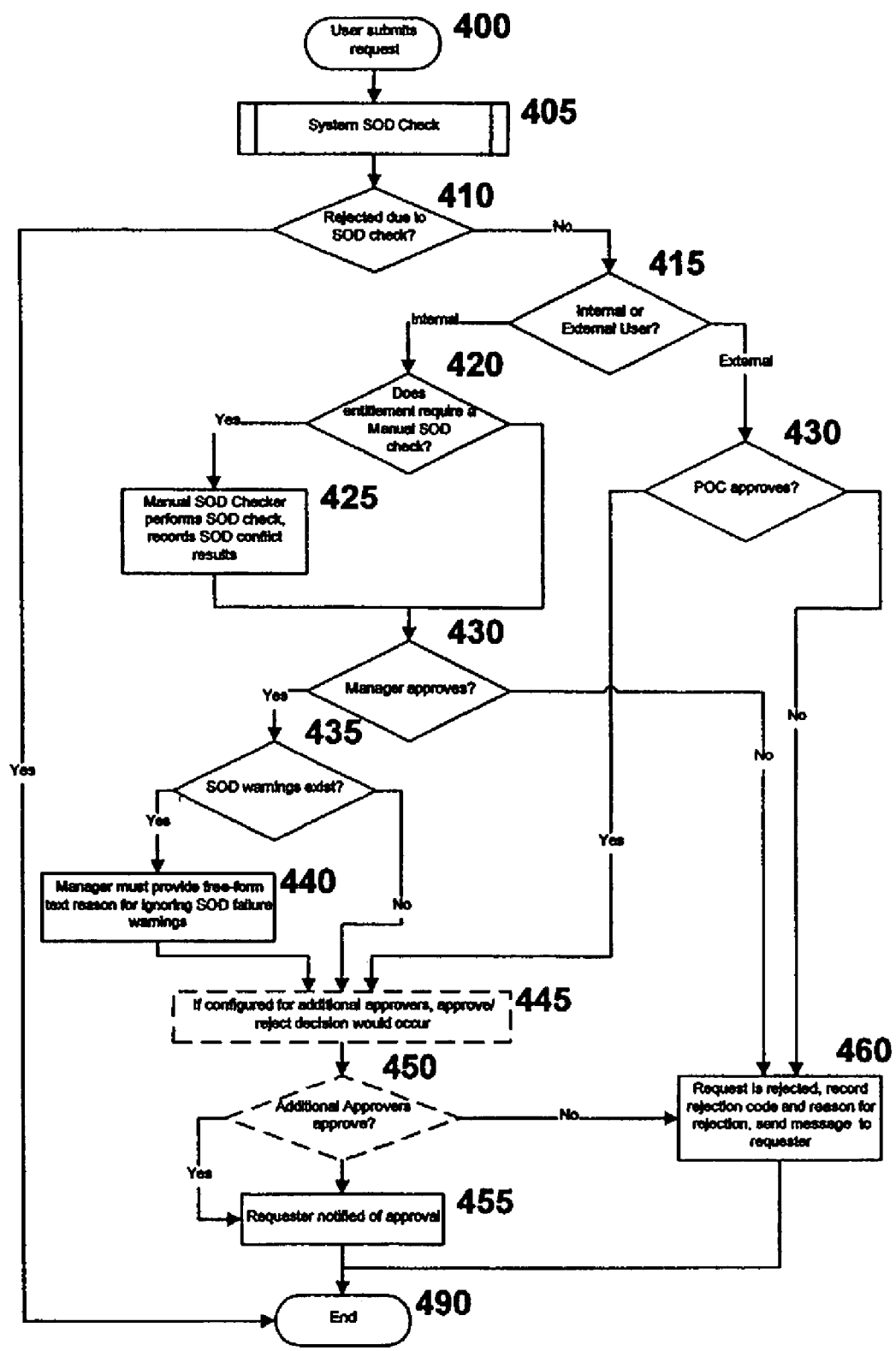
FIG. 4 describes in graphical form the entitlement request approval work flow for the preferred embodiment DECAF system.
Figure 5:
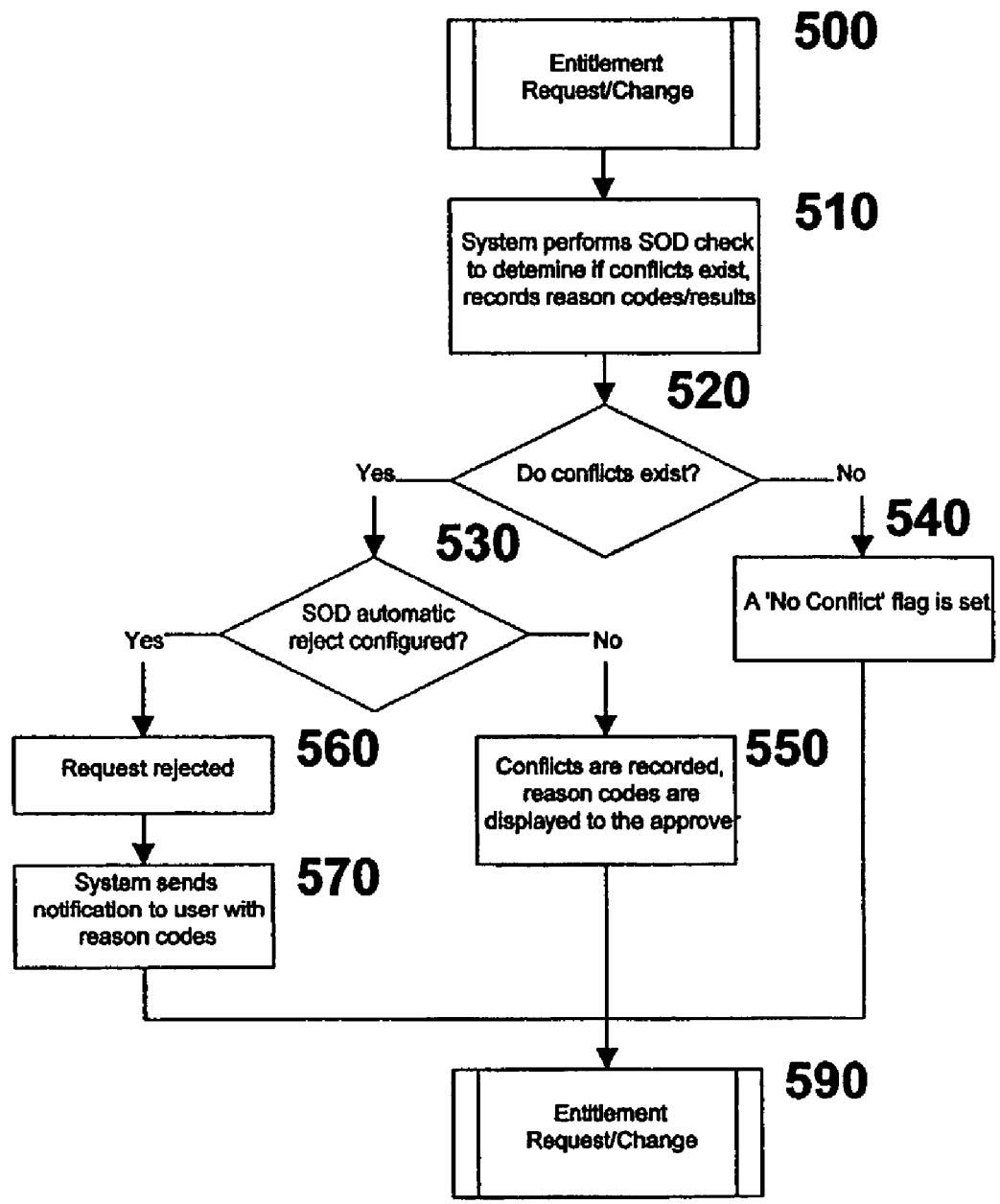
FIG. 5 details in graphical form the preferred Separation of Duties approval work flow.

FIG. 4 contains the detailed actions of a User actor entitlement request abstracted in FIG. 1 by blocks 100, 150, 160, 180, and 190. The User actor submits a request for entitlement in block 400. An SOD check is performed at the beginning of the process in block 405. FIG. 5 provides the details of the SOD check process. The results of the SOD check are tested in block 410. If the request is rejected by the SOD check in block 405, the flow passes to block 490 and the process is complete. If the request is not rejected by the SOD check, the User actor is determined to be internal or external in block 415.

A request from an external User actor is passed to the responsible POC for approval in block 430 then to other defined approvers, if applicable, in blocks 445 and 450 if the POC approves the request. Notification of the approval is sent to the User actor in block 455. Otherwise, if the POC rejects the request in block 430, a record of the rejection is archived and the User actor is notified of the rejection in block 460.

A request from an internal User actor is passed to block 420 to determine if a manual SOD check is required in block 425. The internal User actor's manager approves or rejects the request in block 430 in the preferred embodiment of the DECAF system. If the manager rejects, a record of the rejection is archived and the User actor is notified of the rejection in block 460. If the manager approves the request and SOD warnings were flagged from the manual check in block 425, the manager provides a reason for ignoring the SOD warning in block 440. The request is passed to other defined approvers, if applicable, in blocks 445 and 450. Notification of the approval is sent to the User actor in block 455. Notification of rejection is sent to the User actor in block 460.

Once a User actor's request is approved, the User actor has access to the target application until the entitlement expires or is revoked.

Revocation is accomplished in three ways in the preferred embodiment DECAF system. A userid for a User actor can be revoked affecting all entitlements for the User actor. Specific entitlements for a User actor can be revoked. A userid for a User actor can be locked preventing use of the userid until it is unlocked. This option limits access to entitlements without having to reentitlements at a later date.

The Revoke Administrator actor initiates the process by accessing the Revoke User screen of the preferred embodiment DECAF system. The Revoke Administrator selects which application(s) to work with, then selects the User actor(s) to work with from the presented list. The Revoke Administrator has four options; revoke the userid, revoke specific entitlements, groups, or data type values for the User actor or group, lock the userid, or unlock the userid. When a User actor's entitlement(s) or group(s) is revoked, locked, or unlocked an e-mail is sent to the user and manager or POC indicating that his status has changed.

The preferred embodiment DECAF system provides a security mechanism to insure that inactive User actors are removed from the system and that User actor entitlements remain valid. The mechanism is referred to as re-certification. An administrator initiates the Reprocess. E-mails are sent to Customer Owners asking them to re-certify the User actor profiles they are responsible for. The e-mail contains a URL which points to a page where the reprocess is accessed. Customer owners may log on to the preferred embodiment DECAF system, go to main menu and then select "Approval" menu and reprofiles by clicking on the pending records that appear below the "ReProfile" or "ReUser Entitlements" link. Customer owners may also click on the URL received in the e-mail. Preferably, the present invention uses what is typically known as a standard three tier webarchitecture on a Unix based machines, and more preferably AIX from IBM Corporation. Alternatively, other similar environments such Windows NT from Microsoft Corporation or Mainframe based systems may be suitable substitutes. Preferably, the architecture is implemented with a web server, application server, and database server. Server clustering is also recommended to increase overall system up and response. The database should reside on within a Relational Database and more preferably DB2 Universal Database from IBM Corporation. Web pages are served from a web server, preferably WebSphere from IBM Corporation.

Functionality for the preferred embodiment DECAF system includes: 1) Direct Enablement projects which would allow a user to request and receive an entitlement without additional human action. 2) Enhanced maintenance for projects by allowing the addition and deletion of entitlements, movement of entitlements between projects, coping projects into new projects, and addition of entitlements from all users defined to the project. 3) The ability to lock and unlock entitlements similar to locking and unlocking userids. Request for access could not be made against locked entitlements.

There are no known limitations to the preferred embodiment DECAF system.

It is thus believed that the operation and construction of the present invention will be apparent from the foregoing description. The description of the embodiments of the present invention is given above for the understanding of the present invention. It will be understood that the invention is not to the particular embodiments described herein, but is capable of various modifications, rearrangements and substitutions will now become apparent to those skilled in the art without departing from the scope of the invention. Therefore it is intended that the following claims cover all such modifications and changes as fall within the true spirit and scope of the invention.

The invention claimed is:

1. A method for controlling access to an application in a distributed computer networked environment, the networked environment comprising an application area and a distributed access control facility, comprising the steps of:

submitting a user request for access to an application;

issuing through the application the request to the distributed access control facility along with pertinent user information;

performing a separation of duties check based on a separation of duties matrix which is defined prior to entitlements being made available for access requests so that separation of duty check can be automatically performed and involved in checking cross-entitlements to identify a conflict before the separation of duties matrix can be used for an entitlement request approval process;

determining the type of user;

seeking separation of duties approval based on type of user; and providing for an override of the separation of duties check if the user failed the separation of duties check.

2. The method of claim 1 wherein the types of users comprise external and internal users.

3. The method of claim 2 also comprising the step of routing the external user request to a point of contact.

4. The method of claim 3 also comprising the step of routing the internal user through an approval process if the internal user failed the separation of duties check.

5. A method for controlling access to an application in a distributed computer networked environment, the networked environment comprising an application area and a distributed access control facility, comprising the steps of:

attempting through a user to access the application in the application area;

requesting through the application area information regarding the user;

sending through the application area an authorization request;

comparing the information received from the application area and the application to information created in the distributed access control facility in an access repository, wherein said comparing includes a separation of duties check using a separation of duties matrix which is defined prior to entitlements being made available for access requests so that separation of duty check can be automatically performed and involved in checking cross-entitlements to identify a conflict before the separation of duties matrix can be used for an entitlement request approval process;

sending the results of such comparison to the application; and having the application grant access to the application based on the results of such comparison.

6. The method of claim 5 wherein the step of sending the results of such comparison also comprises providing the level of access the user has to such application.

7. The method of claim 5 wherein the information created in the distributed access control facility comprises a user entitlement for the application and the step of comparing determines the user entitlement for the application.

8. The method of claim 7 wherein the information created in the distributed access control facility comprises the separation of duties matrix formed using a plurality of user entitlements and applications.

9. A program storage device readable by machine, tangibly embodying a program of instructions executable by the machine to perform method steps for controlling access to an application in a distributed computer networked environment, the networked environment comprising an application area and a distributed access control facility, the method comprising the steps of:

attempting through a user to access the application in the application area;

requesting through the application area information regarding the user;

sending through the application area an authorization request;

comparing the information received from the application area and the application to information created in the distributed access control facility in an access repository, wherein said comparing includes a separation of duties check using a separation of duties matrix;

sending the results of such comparison to the application which is defined prior to entitlements being made available for access requests so that separation of duty check can be automatically performed and involved in checking cross-entitlements to identify a conflict before the separation of duties matrix can be used for an entitlement request approval process; and having the application grant access to the application based on the results of such comparison.

10. The method of claim 9 wherein the step of sending the results of such comparison also comprises providing the level of access the user has to such application.

11. The method of claim 9 wherein the information created in the distributed access control facility comprises a user entitlement for the application and the step of comparing determines the user entitlement for the application.

12. The method of claim 11 wherein the information created in the distributed access control facility comprises the separation of duties matrix formed using a plurality of user entitlements and applications.

* * * * *